(12) United States Patent
Allaire (10) Patent No.: US 8,708,069 B2
(45) Date of Patent: Apr. 29, 2014

(54) VEHICLE SUSPENSION SYSTEM

(75) Inventor: Marius Allaire, Saint-David de Falardeau (CA)

(73) Assignee: L'Équipe Fabconcept Inc., Montreal (CA)

( * ) Notice: Subject to any disclaimer, the term of this patent is extended or adjusted under 35 U.S.C. 154(b) by 0 days.

(21) Appl. No.: 13/456,469

(22) Filed: Apr. 26, 2012

(65) Prior Publication Data

US 2013/0284525 A1    Oct. 31, 2013

(51) Int. Cl.
*B62D 55/00* (2006.01)

(52) U.S. Cl.
USPC ............ 180/9.1; 180/9.5; 180/9.54; 305/130; 305/132; 305/133

(58) Field of Classification Search
USPC .................. 180/9.5, 9.54; 305/130, 132, 133
See application file for complete search history.

(56) References Cited

U.S. PATENT DOCUMENTS

| | | | | |
|---|---|---|---|---|
| 2,116,835 A * | 5/1938 | Kegresse | | 280/687 |
| 2,223,490 A * | 12/1940 | Landry | | 180/9.58 |
| 2,504,128 A * | 4/1950 | Jacobson et al. | | 305/9 |
| 3,752,499 A * | 8/1973 | Brandstadter | | 280/6.157 |
| 5,340,205 A * | 8/1994 | Nagorcka | | 305/132 |
| 6,435,292 B2 * | 8/2002 | Lemke et al. | | 180/9.62 |
| 7,172,257 B2 | 2/2007 | Tamaru | | |
| D632,613 S * | 2/2011 | Allaire et al. | | D12/12 |
| 8,083,242 B2 | 12/2011 | Brazier | | |
| 8,157,335 B2 * | 4/2012 | Poirier | | 305/134 |
| 8,302,710 B2 * | 11/2012 | Allaire | | 180/9.54 |
| 2003/0117017 A1 | 6/2003 | Holf | | |
| 2006/0113095 A1 * | 6/2006 | Radke et al. | | 172/828 |
| 2008/0211298 A1 * | 9/2008 | Poirier | | 305/130 |
| 2010/0230184 A1 * | 9/2010 | Allaire | | 180/9.1 |
| 2010/0237574 A1 * | 9/2010 | Allaire | | 280/28.5 |
| 2010/0237658 A1 * | 9/2010 | Allaire et al. | | 296/203.01 |
| 2011/0079452 A1 * | 4/2011 | Poirier | | 180/9.5 |
| 2012/0267866 A1 * | 10/2012 | Allaire | | 280/28.5 |

FOREIGN PATENT DOCUMENTS

| | | |
|---|---|---|
| CA | 2693511 | 8/2010 |
| CA | 2693685 | 8/2010 |
| CA | 2775863 | 8/2010 |

OTHER PUBLICATIONS

Office Action dated Nov. 18, 2011 in U.S. Appl. No. 12/708,430, filed Feb. 18, 2010.

* cited by examiner

*Primary Examiner* — J. Allen Shriver, II
*Assistant Examiner* — Conan Duda
(74) *Attorney, Agent, or Firm* — Mathieu Audet (57) ABSTRACT

A vehicle equipped with a double tandem members suspension system to suspend the vehicle, the double tandem members being operatively interconnected together and adapted to receive idling wheels adapted to support and guide an endless belt thereon to provide significant suspension travel and prevents an endless belt disengagement from the idling wheels.

20 Claims, 11 Drawing Sheets

VEHICLE SUSPENSION SYSTEM

CROSS-REFERENCE TO RELATED APPLICATIONS

No cross-reference.

FIELD OF THE INVENTION

The present invention generally relates to an all-terrain vehicle. More precisely, the present invention relates to a suspension system for an endless belt-driven all-terrain vehicle.

BACKGROUND OF THE INVENTION

Vehicles equipped with endless belt drives are adapted to be used on various types of grounds. Endless belt drives, or caterpillars, are replacing or complementing weight supporting wheels to reduce ground contacting pressure and improve floatation and traction on soft grounds.

Each endless belt is generally installed on a set of idling wheels and/or bearing members supporting and positioning the endless belt on the vehicle. At least one powered cogged wheel, commonly called sprocket, adapted to engage the endless belt to transmit movement to the endless belt and propel the vehicle. Other optional endless belt supports can also be used to ensure proper operation of the endless belt drive.

The weight-supporting wheels are affixed to a suspension system adapted to absorb ground imperfections of rugged terrains and provide a smoother ride to occupants of the vehicle. A wide-travel caterpillar idling wheels suspension system generally allows the passage of significant ground obstacles. However, wide travel suspensions significantly affect the endless belt behavior and increase the risk of disengaging the endless belt from its drive sprocket and/or coming off its weight supporting wheels. Wide travel suspensions also have an effect on the useful life of the endless belt.

A need, therefore, exists for an improved suspension system for the endless belts of all-terrain vehicles.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments, which is presented later.

A suspension system of the present invention (including a kit therefor) may, by way of example, be exploited in relation to an all-terrain vehicle. However, the suspension system of the present invention may be used in relation to other vehicles adapted to serve in contexts that differ from the embodiments illustrated hereinafter.

It is to be understood herein that the term all-terrain vehicle generally refers to an off-road vehicle although the vehicle could alternatively be used on the road. It is further understood that the term endless belt generally refers to a caterpillar-type drive adapted to impart motive power from the vehicle to the ground by a means that provides a wider ground footprint than a wheel. An endless belt, or a caterpillar, can be made of articulated steel parts, rubber, composite materials (woven material and rubber) or other material suitable to this end.

Therefore, at least one embodiment of the invention is adapted to improve at least some of the deficiencies associated with an endless belt suspension adapted to be used with an all-terrain vehicle.

At least one embodiment of the invention provides a suspension system, adapted to be secured to a frame of a vehicle, including a large tandem and a small tandem, acting in series by being consecutively operatively connected, mechanically configured to cambelessly vertically be displaced in respect with the frame.

At least one embodiment of the invention provides a suspension system including a pivot arm adapted to absorb small ground imperfections, a first tandem and a second tandem adapted to absorb larger ground imperfections.

At least one embodiment of the invention provides a suspension system including a pivot arm pivotable about a frame of a vehicle that operatively connects a first tandem and a second tandem, interconnected one on the other, and further configured to transmit less than 10% of the vertical loads applied to the suspension system to the pivot arm.

At least one embodiment of the invention provides a suspension system adapted to be installed on a vehicle to suspend the vehicle and damps ground imperfections, the suspension system including a first tandem member and a second tandem member, pivotally interconnected one to the other on a first side of the first tandem member.

At least one embodiment of the invention provides a suspension system adapted to be installed on a vehicle to suspend the vehicle and damps ground imperfections, the suspension system including a large tandem and a small tandem, pivotally interconnected in series on a first side of the large tandem, a pair of vehicle-supporting idling wheels rotatably connected to a first side of the large tandem being adapted to be located at a forwardmost or a rearwardmost location of the vehicle and adapted to contact the endless belt simultaneously in two angularly distinct endless belt projecting directions.

At least one embodiment of the invention provides an endless belt suspension system that offers a wide travel suspension while preventing the endless belt from coming off its proper operating position.

At least one embodiment of the invention provides an endless belt suspension system that offers a wide travel suspension while preventing the endless belt from wearing out prematurely.

At least one embodiment of the invention provides an endless belt suspension system that requires substantially no camber angle variations along the travel of the suspension.

At least one embodiment of the invention provides a suspension system adapted to allow a camber-less variation endless-belt vertical travel along the suspension travel.

At least one embodiment of the invention provides an endless belt suspension system that allows significant suspension travel thereof of about 300 millimeters.

At least one embodiment of the invention provides an endless belt suspension system allowing at least about 300 millimeters of vertical suspension travel.

At least one embodiment of the invention provides an endless belt suspension system that requires low maintenance and assists in preventing debris from influencing its useful life.

At least one embodiment of the invention provides an endless belt suspension system that uses a double tandem suspension, interconnected in series, for providing improved suspension to a belt-equipped vehicle.

At least one embodiment of the invention provides an endless belt suspension system that transfers about less than 10% of the suspended weight to the tandem pivot with the frame of the vehicle.

At least one embodiment of the invention provides an endless belt suspension system that uses multiple, tandem-mounted, endless belt-supporting idling wheels in accordance with at least one embodiment of the invention.

At least one embodiment of the invention provides an endless belt suspension system that uses multiple asymmetrical tandems mounted in series.

At least one embodiment of the invention provides an endless belt suspension system that uses a main tandem member and a secondary tandem member pivotally connected to one end of the main tandem member.

At least one embodiment of the invention provides an endless belt suspension system that uses a pneumatic suspension damper.

At least one embodiment of the invention provides an endless belt suspension system that uses a dynamic pressure pneumatic suspension damper.

At least one embodiment of the invention provides an endless belt suspension system that uses an auxiliary fluid reservoir coupled to a pneumatic suspension mechanism.

At least one embodiment of the invention provides an endless belt suspension system allowing no camber variation along the vertical travel of the suspension.

At least one embodiment of the invention provides a double tandem mechanism, coupled in series, which is adapted to vertically displace without changing the camber angle of a ground-contacting portion of the caterpillar.

At least one embodiment of the invention provides a suspension system including one pair of idler wheels rotatably secured on a first side of a first tandem member and a two pairs of idler wheels rotatably secured on each sides of a second tandem member, the second tandem member being pivotally secured to a second end of the first tandem.

At least one embodiment of the invention provides a suspension mechanism adapted to transfer less than 10% of the vertical loads applied to the suspension to the pivot arm supporting the tandem.

At least one embodiment of the invention provides an adjustable pressure pneumatic airbag damping movements of the suspension.

At least one embodiment of the invention provides an auxiliary fluid reservoir operatively connected to the pneumatic airbag that acts as a shock absorber or a shock damper for the suspension.

At least one embodiment of the invention provides a pneumatic suspension coupled to a damper to further control the action of the suspension.

At least one embodiment of the invention provides a suspension having two interconnected tandem members having respective pivots longitudinally asymmetrically disposed thereon coupled to a damper to further control the action of the suspension.

At least one embodiment of the invention provides a suspension system for an endless belt drive, the suspension system comprising a pivot arm adapted to be secured to a frame of a vehicle; a first tandem member adapted to be secured to a pivot arm; a first pair of idler wheels rotatably secured to a first side of the first tandem member, a second tandem member pivotally secured to a second side of the first tandem member and adapted to connect two pairs of idler wheels respectively rotatably secured on each side thereof, the pairs of idler wheels being adapted to contact the endless belt to support the vehicle.

At least one embodiment of the invention provides a method for suspending a caterpillar-equipped vehicle, the method comprising providing a plurality of sets of tandem wheels; providing a double tandem suspension members to support the plurality of tandem wheels; and providing a compressible member, such as a pneumatic airbag, to define a vertical position of the plurality of set of tandem wheels.

At least one embodiment of the invention provides a suspension kit comprising a plurality of tandem set of wheels; a double tandem suspension members to support the plurality of tandem set of wheels; and a compressible member, such as a pneumatic airbag, to define a vertical position of the plurality of tandem set of wheels.

At least one embodiment of the invention provides a vehicle comprising a frame; a suspension system connected to the frame to suspend the frame, the suspension system including a pivot arm pivotally secured to the frame of the vehicle at a first end thereof about a pivot arm pivot; a first tandem member pivotally secured to the pivot arm at a second end thereof about a first tandem member pivot; a first pair of idler wheels rotatably secured to a first end of the first tandem member; a second tandem member pivotally secured to a second end of the first tandem member thereof about a second tandem member pivot; a second pair of idler wheels rotatably secured to a first end of the second tandem member; a third pair of idler wheels rotatably secured to a second end of the second tandem member; the idler wheels being adapted to operatively secure thereon an endless belt adapted to be rotated to propel the vehicle; and a suspension member operatively secured between the pivot arm and the frame to suspend the vehicle and adapted to absorb a load variation applied to the suspension system.

At least one embodiment of the invention provides a vehicle suspension system comprising a pivot arm pivotally secured to a frame of the vehicle at a first end thereof about a pivot arm pivot; a first tandem member pivotally secured to the pivot arm at a second end thereof about a first tandem member pivot; a first pair of idler wheels rotatably secured to a first end of the first tandem member; a second tandem member pivotally secured to a second end of the first tandem member thereof about a second tandem member pivot; a second pair of idler wheels rotatably secured to a first end of the second tandem member; a third pair of idler wheels rotatably secured to a second end of the second tandem member; the idler wheels being adapted to operatively secure thereon an endless belt adapted to be rotated to propel the vehicle; and a suspension member operatively secured between the pivot arm and the frame to suspend the vehicle and adapted to absorb a load variation applied to the suspension system.

At least one embodiment of the invention provides a suspension system kit for a vehicle, the kit comprising a pivot arm adapted to be pivotally secured to a frame of the vehicle at a first end thereof about a pivot arm pivot; a first tandem member adapted to be pivotally secured to the pivot arm at a second end thereof about a first tandem member pivot; a first pair of idler wheels adapted to be rotatably secured to a first end of the first tandem member; a second tandem member adapted to be pivotally secured to a second end of the first tandem member thereof about a second tandem member pivot; a second pair of idler wheels adapted to be rotatably secured to a first end of the second tandem member; a third pair of idler wheels adapted to be rotatably secured to a second end of the second tandem member; the idler wheels being adapted to rotatably secure thereon an endless belt adapted to be rotated to propel the vehicle; and a suspension member adapted to be operatively secured between the pivot arm and the frame to suspend the vehicle and is adapted to absorb a load variation applied to the suspension system when the suspension system kit is mounted on the vehicle.

Other objects, aspects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which.

DESCRIPTION OF ILLUSTRATIVE EMBODIMENTS OF THE INVENTION

The present invention will now be described with reference to the drawings, wherein like reference numerals are used to refer to like elements throughout when desirable. In the following description, for purposes of explanation, numerous specific details are set forth in order to provide a thorough understanding of the present invention. It may be evident, however, that the present invention may be practiced without these specific details.

Figure 1:
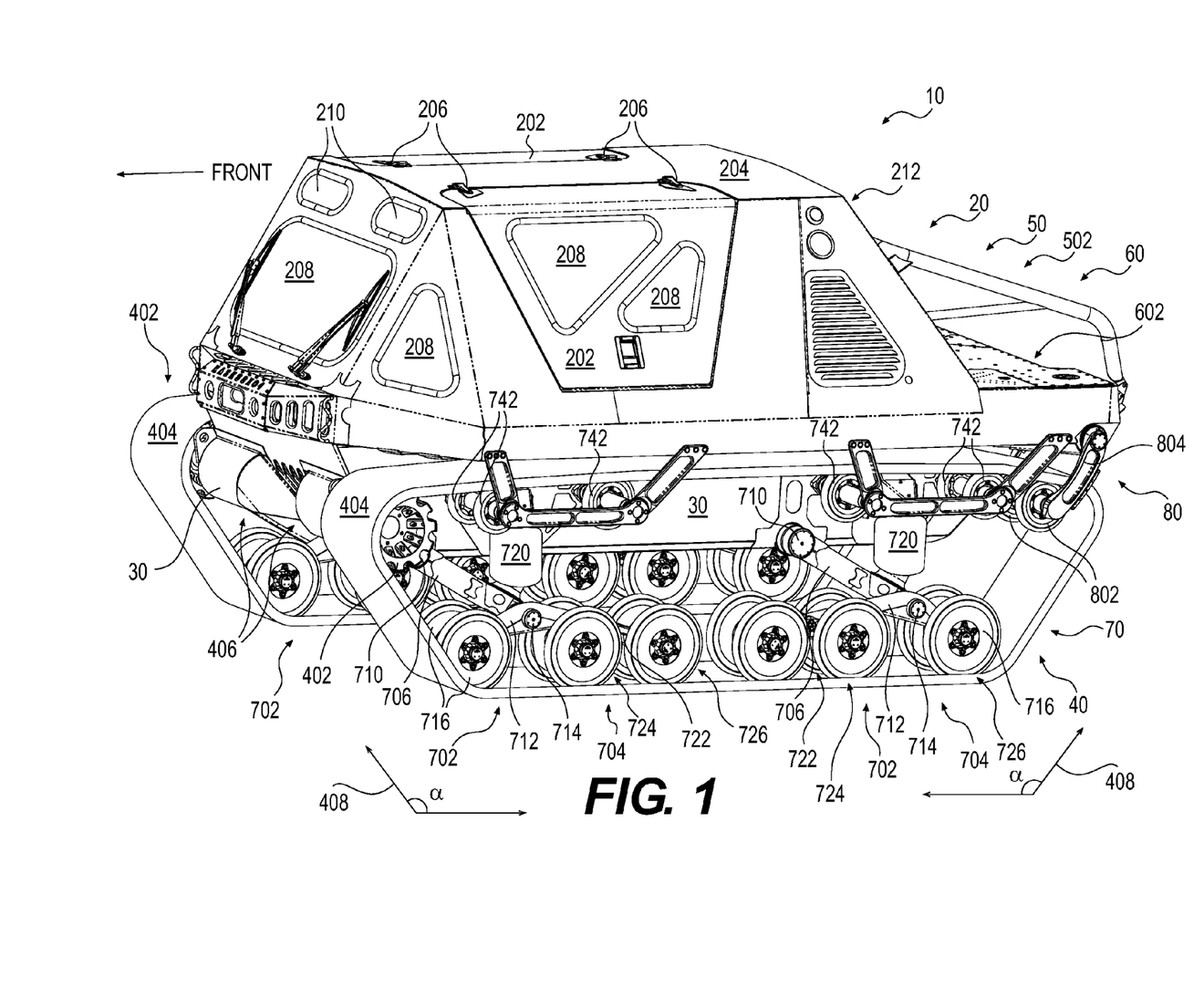
FIG. 1 is a front-left isometric view of an all-terrain vehicle in accordance with at least one embodiment of the invention.
Figure 2:
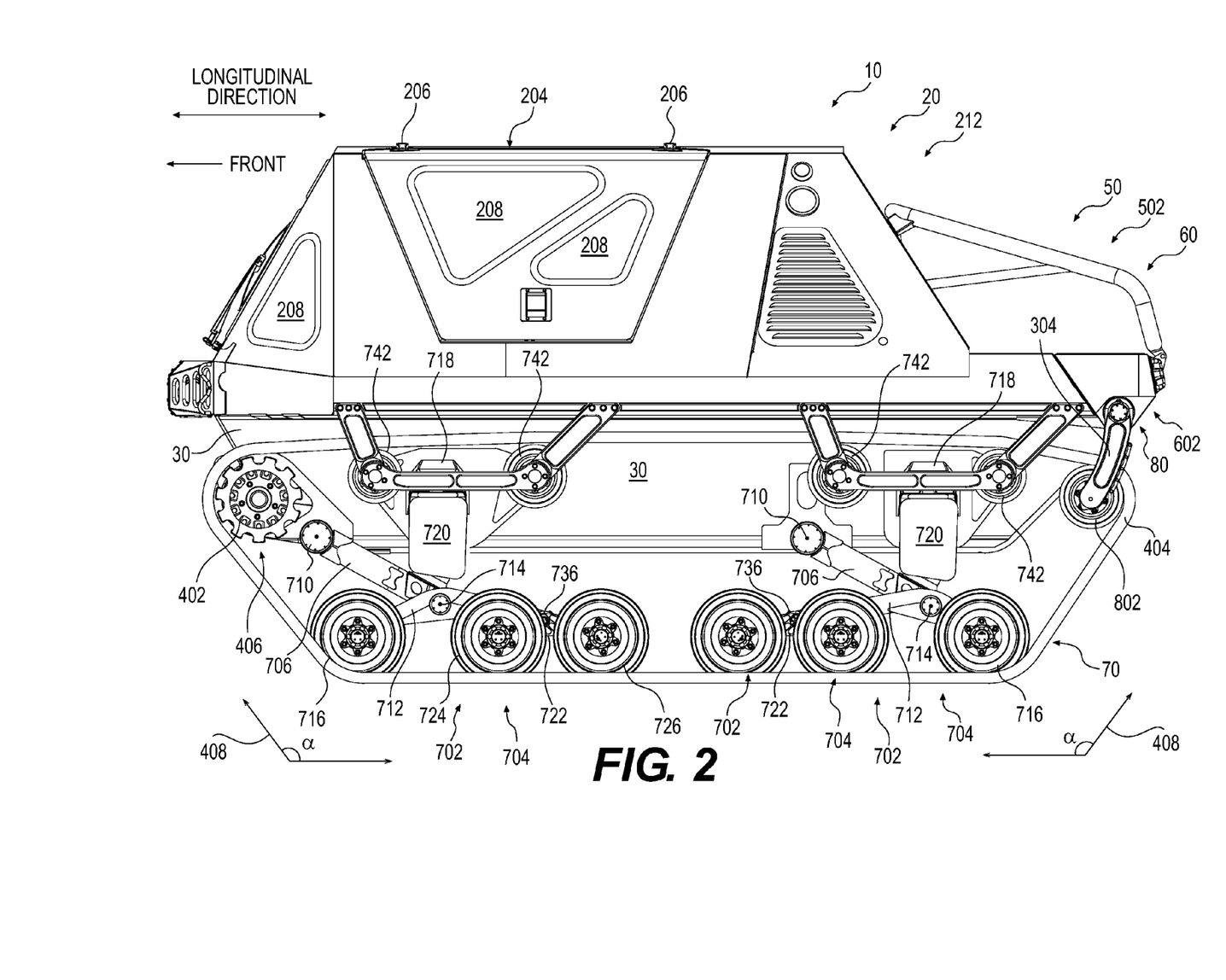
FIG. 2 is a left side elevation view of the all-terrain vehicle of FIG. 1 in accordance with at least one embodiment of the invention.
Figure 3:
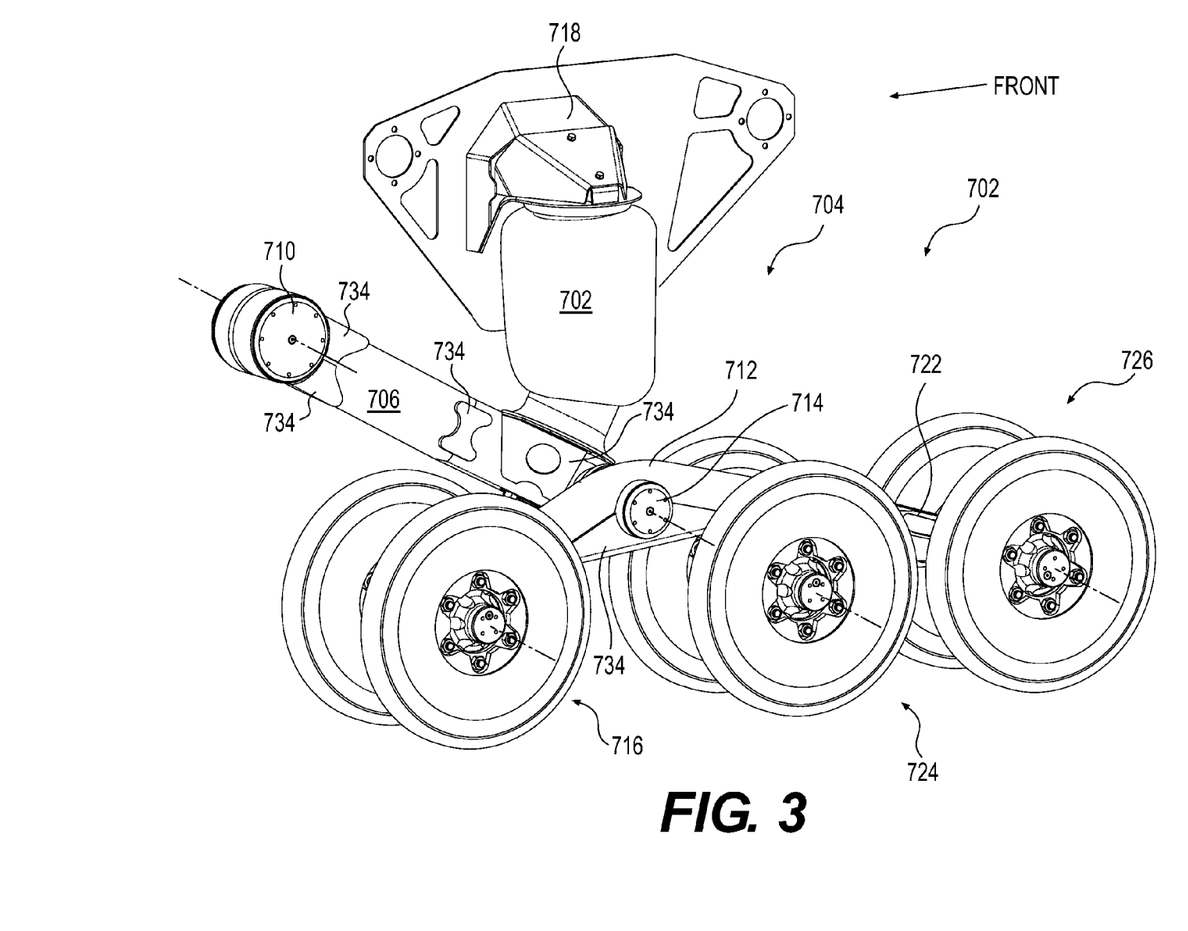
FIG. 3 is an isometric view of a front suspension unit of the all-terrain vehicle of FIG. 1 in accordance with at least one embodiment of the invention.
Figure 4:
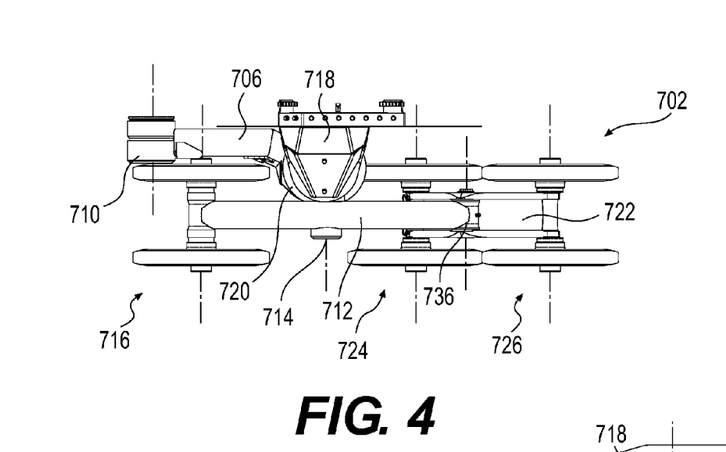
FIG. 4 is a top plan view of the front suspension unit of FIG. 3 in accordance with at least one embodiment of the invention.
Figure 5:
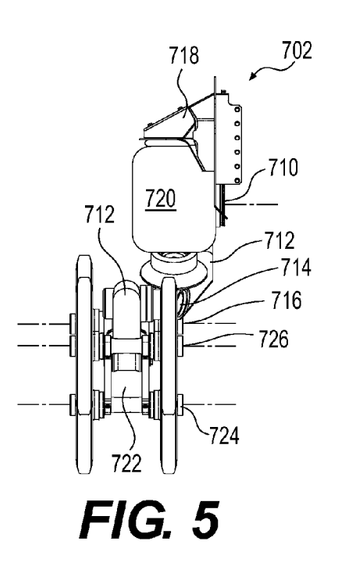
FIG. 5 is a rear elevation view of the suspension unit of FIG. 3 in accordance with at least one embodiment of the invention.
Figure 6:
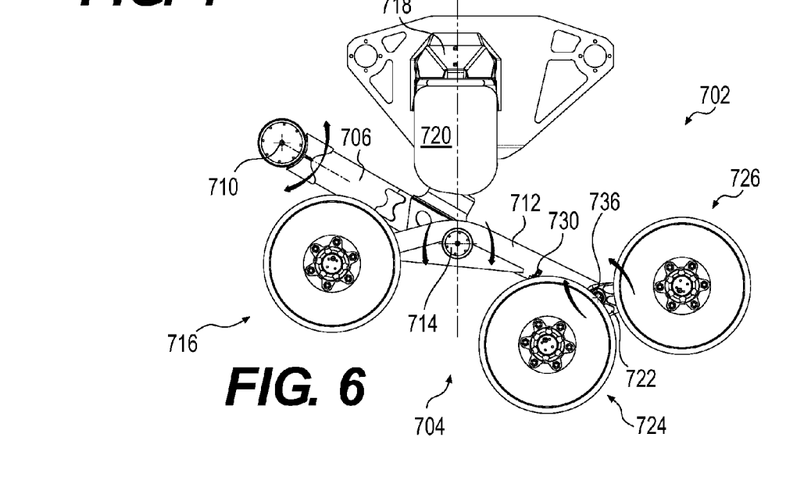
FIG. 6 is a left side elevation view of the front suspension unit of FIG. 3 in accordance with at least one embodiment of the invention.
Figure 7:
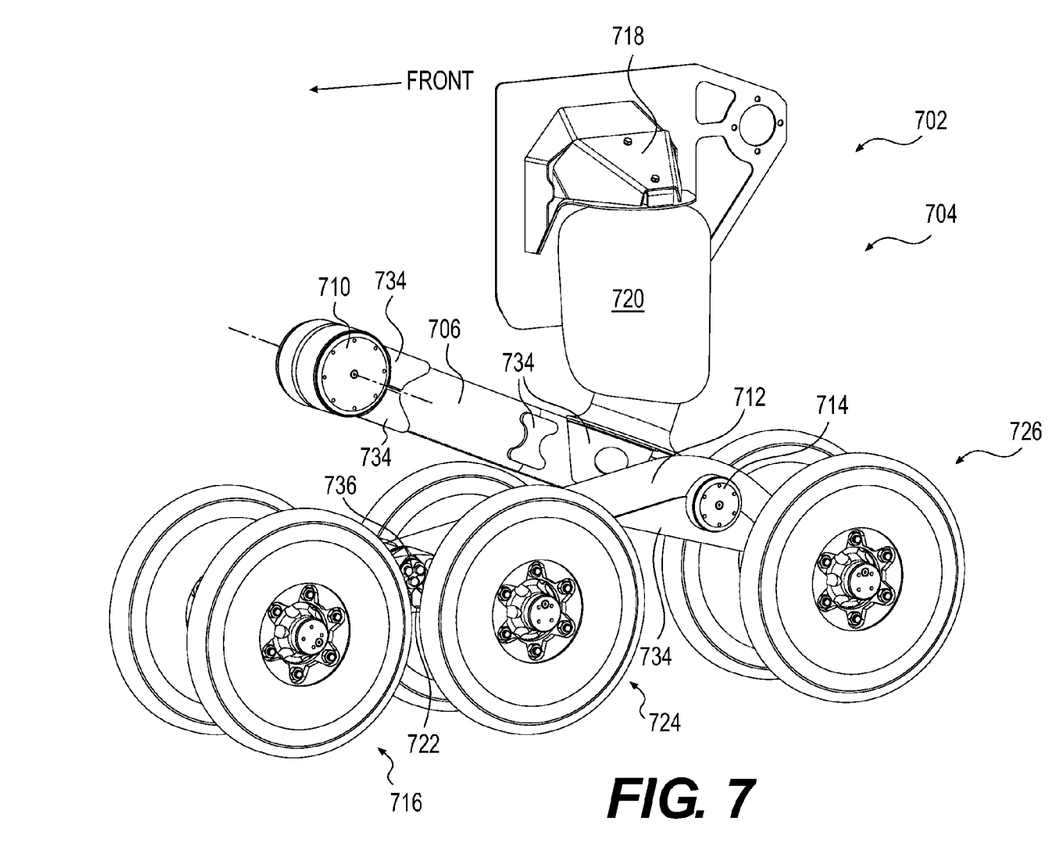
FIG. 7 is an isometric view of a rear suspension unit of the all-terrain vehicle of FIG. 1 in accordance with at least one embodiment of the invention.
Figure 8:
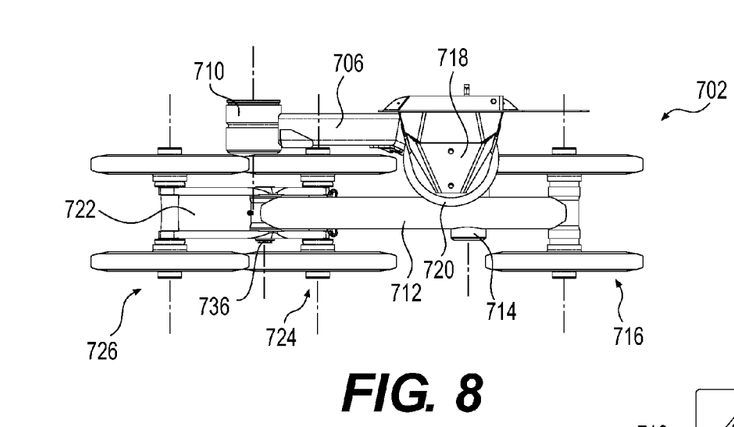
FIG. 8 is a top plan view of the rear suspension unit of FIG. 7 in accordance with at least one embodiment of the invention.
Figure 9:
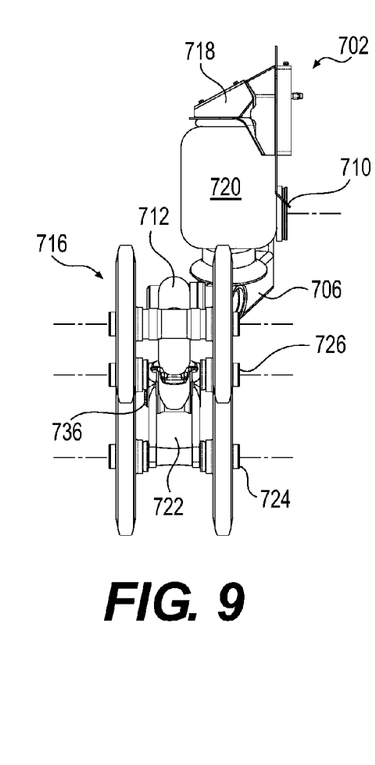
FIG. 9 is a rear elevation view of the suspension unit of FIG. 7 in accordance with at least one embodiment of the invention.
Figure 10:
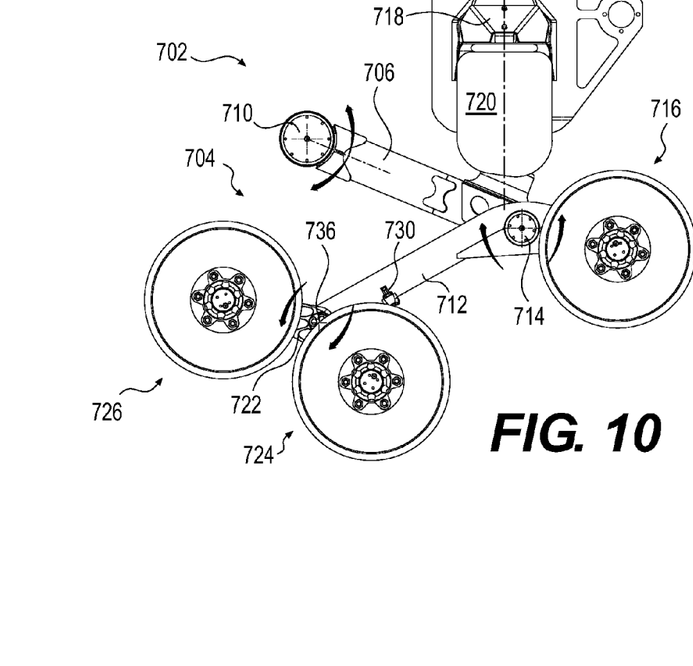
FIG. 10 is a left side elevation view of the rear suspension unit of FIG. 7 in accordance with at least one embodiment of the invention.

Thus, an embodiment of the invention is shown on FIGS. 1 and 2 illustrating an all-terrain vehicle 10. The all-terrain vehicle 10 includes, inter alia, a passenger compartment 20, a frame 30, a drive system 40, a power pack 50, a hydraulic system 60, a suspension system 70 and an endless belt tensioner system 80. The passenger compartment 20 is provided with doors 202 pivotally secured on each side of a roof portion 204 via hinges 206, windows 208 disposed on the periphery of the vehicle 10, a back window 212 and a plurality of lights 210.

Manufacturing of the passenger compartment 20 of the illustrated embodiment is generally made in aluminum material for reasons of strength and weight. Other material, like steel, plastic or composite materials, could be used within the scope of the present invention without departing therefrom.

The passenger compartment 20 is mounted to the frame 30 thus forming a monocoque construction that enhances the rigidity and the strength of the overall vehicle assembly. Most parts of the vehicle assembly can be fastened, glued, welded, riveted or secured by other suitable means known in the art of vehicle manufacturing. The doors 202 are provided with a translucid portion that provides extended see-through area.

The power pack 50 is housed in and secured to the frame 30. The power pack 50 is preferably located low in the frame 30 to keep the center of gravity of the vehicle 10 as low as possible. Preferably, the power pack 50 is transversally centered in the vehicle 10 for reasons of lateral weight distribution (optimally even on each side). The longitudinal position of the power pack 50 can vary in accordance with the desired mass distribution and volume allocation. In this respect, the power pack 50 can be disposed in the center of the vehicle 10 to advantage mass distribution. In contrast, the power pack can be positioned toward the rear of the frame 30 to allow maximum room therein for passengers.

An internal combustion engine 502, e.g. a diesel or gas engine, powers a hydraulic system 60 via a rotating or reciprocating hydraulic pump 602. The internal combustion engine 502 could alternatively power more than one hydraulic system 60 and/or hydraulic pumps 602. More than one hydraulic pump 602 and/or hydraulic systems 60 might be desirable for reasons of safety if the vehicle 10 is expected to be used in extreme circumstances by offering redundant systems. The pressurized hydraulic system 60 powers hydraulic motors 406 that, in turn, mechanically power the drive system 40 via sprockets 402, which are engaged to endless belts 404. Intermediate planetary gearboxes (not shown) reduce the ratio between each hydraulic motor 406 and its associated sprocket 402. The sprockets 402 of the drive system 40 propel the vehicle 10 by rotating the endless belts 404. Two hydraulic motors 406 are installed in the vehicle 10, each moving one of the two endless belts 404. The vehicle 10 of an embodiment of the invention is steered using a difference in rotation of the two hydraulic motors 406.

Still referring to FIG. 1 and FIG. 2, the suspension system 70 comprises a plurality of suspension units 702. Each suspension unit 702 uses a multiple tandem configuration 704 pivotally coupled to a pivot arm 706 that is pivotally secured to the frame 30 of the vehicle 10. The pivot arm 706 of the suspension unit 702 is pivotally connected at a first end thereof to the frame 30 via a pivot arm pivot 710. In one embodiment, the pivot arm 706 is intended to be adapted to absorb small bumps on the ground when the vehicle 10 moves. A first tandem member 712 is pivotally connected to a second end of the pivot arm 706 about a first tandem pivot 714. The first tandem member 712 includes a first pair of vehicle-supporting idler wheels 716 rotatably secured at a first end thereof from which angularly projects 408 the endless belt 404 on each longitudinal side, and a second tandem member 722 pivotally secured to a second end thereof about a second tandem member pivot 736. The second tandem member 722 includes a second pair of vehicle-supporting idler wheels 724 rotatably secured at a first end thereof and a third pair of vehicle-supporting idler wheels 726 rotatably secured at a second end thereof. The pairs of vehicle-supporting idler wheels 716, 724, 726 are supporting the vehicle 10, locating and guiding the endless belt 404 while allowing a rotation of the endless belt 404 about a longitudinal direction of the vehicle 10. In an embodiment, the tandems 712, 722 are adapted to provide significant suspension travel to manage large bumps on the ground. The combined pivot arm 706 and double tandem suspension arrangement provides a suspension adapted to manage efficiently small bumps, or ground imperfections, and large bumps, or ground imperfections, allowing maximum speed on over a variety of obstacles. A plurality of belt-supporting idler wheels 742 is rotatably secured to the frame 30 to support an upper portion of the endless belt 404. One can appreciate that, in the illustrated embodiment, three belt-supporting idler wheels 742 are used per suspension unit 702.

Tension in the endless belt 404 is managed by the tensioner system 80. Tension wheels 802 are adapted to move along the radius generated by tension lever 804 thus extending or retracting the circumference of the endless belt 404. The tensioner system 80 is adapted to provide proper tension in the endless belt 404 by dynamically adapting to operating conditions of the vehicle 10 ideally to keep a predetermined operating endless belt 404 tension over a complete range of suspension travel.

As better seen in the exemplary embodiment illustrated in FIG. 1 through FIG. 10, it can be appreciated that the vehicle suspension system 70 uses a pneumatic suspension mechanism to define the height of the vehicle 10 and absorb shocks caused by ground imperfections. An upper pneumatic airbag support 718, adapted to receive and secure thereto an upper side of the pneumatic airbag 720, is fasten to the frame 30. A lower portion of the pneumatic airbag 720 is secured to the pivot arm 706 to restrict movements of the pivot arm 706 in respect with the frame 30 of the vehicle 10. One can appreciate that the pneumatic airbag 720 is secured near the first tandem pivot 714 to support most of the mechanical load and prevent transferring most vertical mechanical load to the pivot arm pivot 710. The illustrated embodiment is configured to transfer less than 10% of the vertical mechanical load to the pivot arm pivot 710.

The suspension geometry uses the pivot arm pivot 710 to guide the combined vertical movement of the first tandem member 712 and the second tandem member 722. The pivot arm pivot 710 of the present embodiment has a horizontal axis that is orthogonal to the longitudinal direction of the vehicle 10. This ensures that the vertical movement of the first tandem member 712 and the second tandem member 722 does not cause a camber modification of the endless belt 404 ground-contacting portion. The tension in the endless belt 404 thus remain substantially even over the width of the endless belt 404. The angular consistency of the ground-contacting portion of the endless belt 404 improves the traction with the ground and reduces the risk of endless belt 404 disengagement with the idler wheels 716, 724, 726 of the drive system 40 over the complete travel of the suspension system 70.

The pneumatic airbag 720 contains a fluid, generally air, which is compressible. Other fluids, in gaseous or liquid phase, adapted to serve the present function are considered to be circumscribed by the present application. Thus, compression of the pneumatic airbag 720 and pressure therein define the height of the frame 30 in respect with the ground—or the lower portion of the endless belt 404. The volume of air and the pressure inside the pneumatic airbag 720 is adapted to vary. Air inside the pneumatic airbag 720 can be added or removed via a pneumatic tube (not illustrated) preferably disposed in and protected by a recess (not illustrated) provided in the upper support 718.

Figure 11:
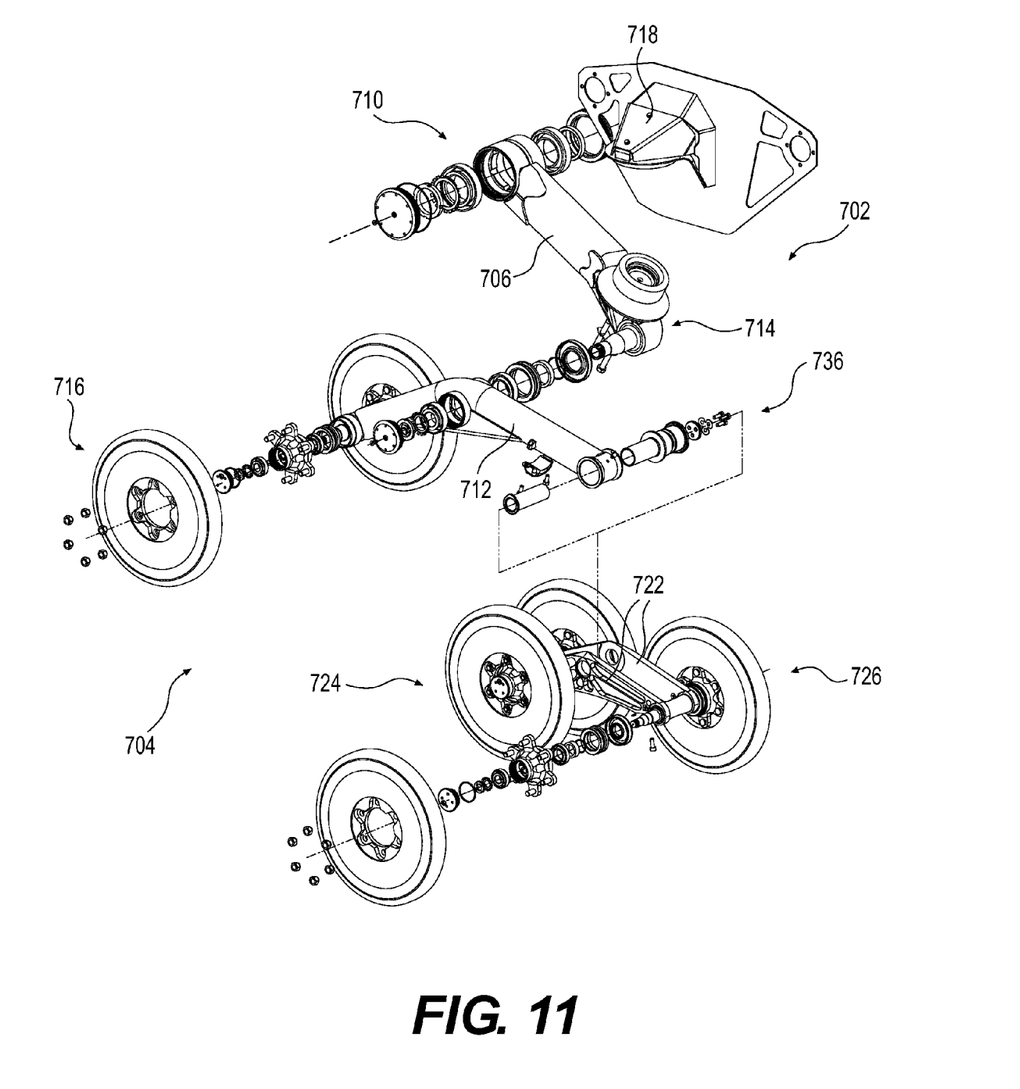
FIG. 11 is an isometric exploded view of a suspension unit in accordance with at least one embodiment of the invention.

The suspension units 702 in the front of the vehicle 10 and the suspension units 702 at the rear of the vehicle 10 are slightly different. FIG. 3 through FIG. 6 illustrate a front suspension unit 702. In contrast, FIG. 7 through FIG. 10 illustrate a rear suspension unit 702. One of the differences is that the first pair of idling wheels 716 of the first tandem member 712 are located in opposite directions. The suspension units 702 installed at the front of the vehicle 10 are using the first pair of idling wheels 716 in front. One of the reasons is that the simple tandem arrangement supporting the first pair of idling wheels 716 are more prone to move without influencing negatively the tension of the endless belt over the travel of the suspension. It also serves as a more stable configuration on the forward attack edge of the endless belt 404. The same reasoning is also applicable to the suspension units 702 installed at the rear of the vehicle 10 that are using the first pair of idling wheels 716 at the complete rear of the vehicle 10. It can also be appreciated from FIG. 6 and FIG. 10 that a second tandem member angular stopper 730 is provided on the first tandem member 712 to restrict the angular movement of the second tandem member 712 in respect with the first tandem member 712 by abutting the second tandem member 712 at a predetermined angle. Reinforcements 734 are provided, welded, fastened or the like to the elements of the suspension unit 702 in order to sustain the applicable loads without necessarily oversizing all the components. An exploded view of a suspension unit assembly 702 is provided in FIG. 11 to display with more details the parts of the assembly. From FIG. 11 one can appreciate that the pivot arm 706, the first tandem member 712 and the second tandem member 722 could be made of bent metallic tubes, casting parts, machines billets or other suitable methods, materials and shapes to serve the desired end result illustrated and explained in the present patent application.

Figure 12:
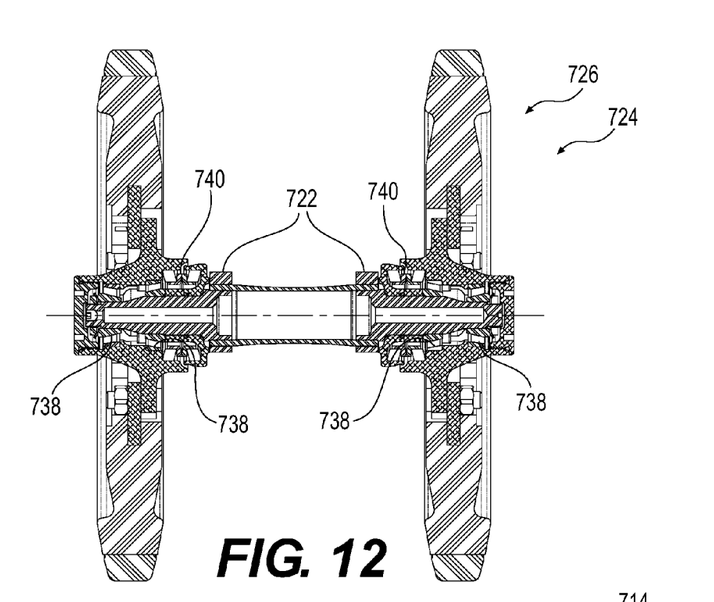
FIG. 12 is a cross-sectional view of a pair of supporting wheels of the suspension unit in accordance with at least one embodiment of the invention.
Figure 13:
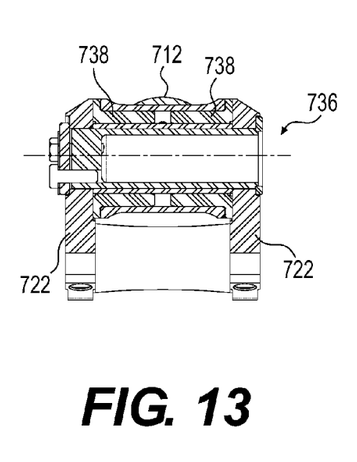
FIG. 13 is an enlarged cross-sectional view of a portion of the first tandem pivot of the suspension unit in accordance with at least one embodiment of the invention.
Figure 14:
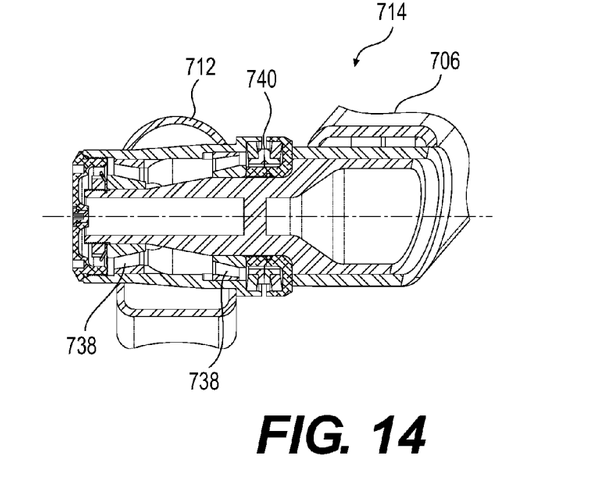
FIG. 14 is an enlarged cross-sectional view of a portion of the pivot arm pivot of the suspension unit in accordance with at least one embodiment of the invention.

Turning now to FIG. 12 illustrating one possible assembly of a pair of idling wheels 716, 724, 726 in accordance with at least one embodiment of the invention. The assembly includes several bearing members 738 and seal members 740 all interacting in an assembly axially secured with fasteners. FIG. 13 illustrates a second tandem pivot 736 assembly while FIG. 14 illustrates a pivot arm pivot 714 assembly.

Figure 15:
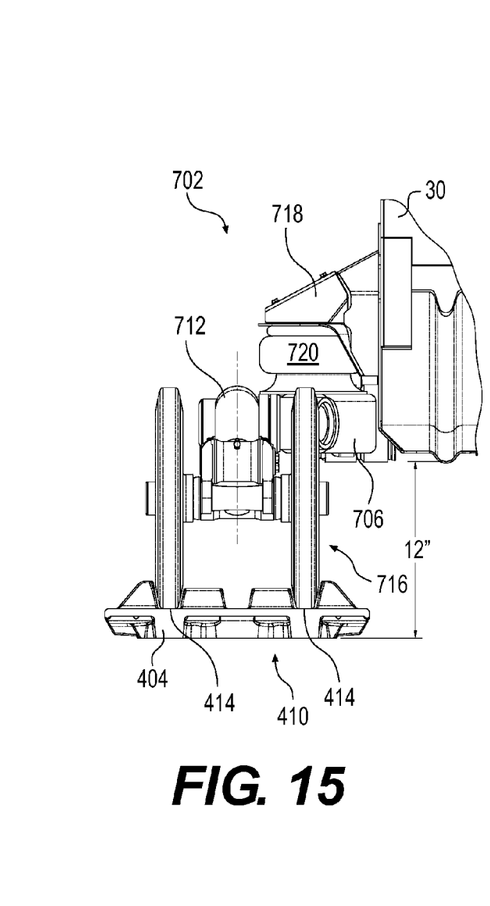
FIG. 15 is an elevation view of the suspension in its uppermost position in accordance with at least one embodiment of the invention.
Figure 16:
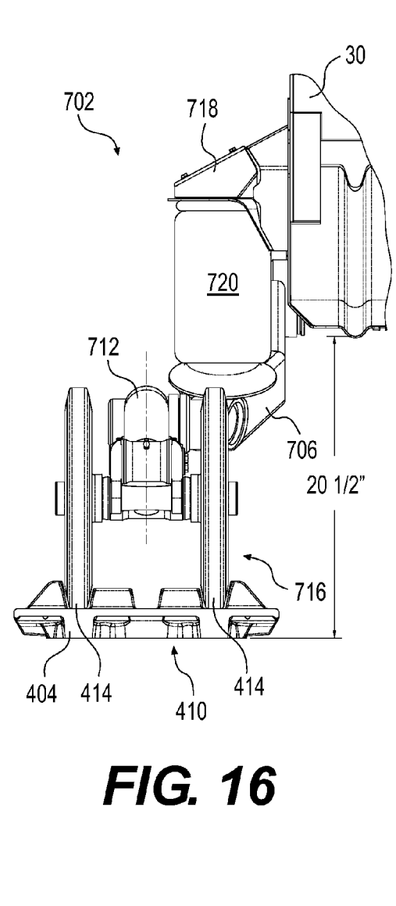
FIG. 16 is an elevation view of the suspension unit in its nominal position in accordance with at least one embodiment of the invention.
Figure 17:
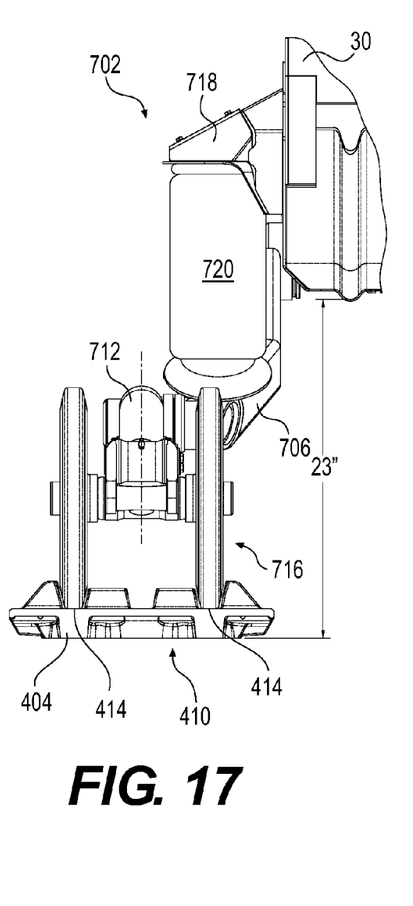
FIG. 17 is an elevation view of the suspension unit in its lowermost position in accordance with at least one embodiment of the invention.
Figure 18:
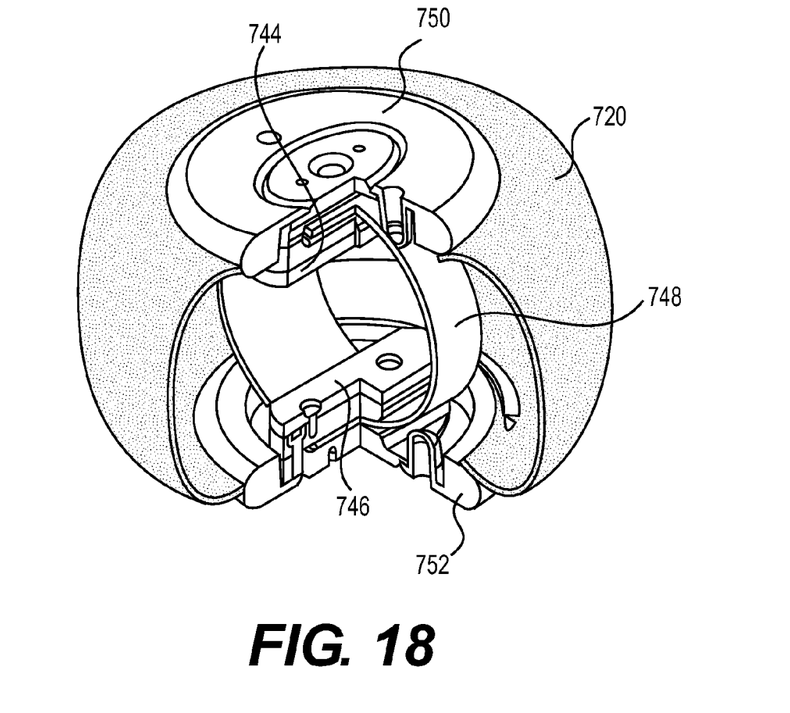
FIG. 18 is a cross-sectional view of a pneumatic bag in accordance with at least one embodiment of the invention.

FIG. 15 illustrates a compressed suspension unit assembly 702, FIG. 16 illustrates a semi-compressed suspension unit assembly 702 and FIG. 17 illustrates an extended suspension unit assembly 702 in accordance with at least one embodiment of the invention. These Figures allows the ground-contacting portion 410 of the endless belt 404 to remain with the same camber (remain horizontal at any position along the suspension travel). It can also be appreciated that the idling wheels 716 are sized and designed to mate with longitudinal wheel-receiving cavities 414 included in the endless belt 404 to locate and operatively maintain the endless belt 404 in operating cooperation with the suspension unit assembly 702.

More detailed views of the pneumatic airbag 720 and surrounding parts are provided on FIG. 18 through FIG. 21. Internal bumpers 744 and 746 are disposed inside the pneumatic airbag 720 to stop or limit compression movements of the pneumatic airbag 720. In the present embodiment, two urethane plastic parts are illustratively used. The pneumatic airbag 720 is also provided with a distance limiter member 748 disposed therein. The distance limiter member 748 is a flexible member that does not stretch under tension and limits the longitudinal expansion of the pneumatic airbag 720. In the present situation the distance limiter member 748 is a composite rubberized belt (nylon). The internal bumpers 744 and 746 and the distance limiter member 748 are attached to the upper airbag connector 750 and the lower airbag connector 752, which also ensure that the pneumatic airbag 720 is airtight.

Figure 19:
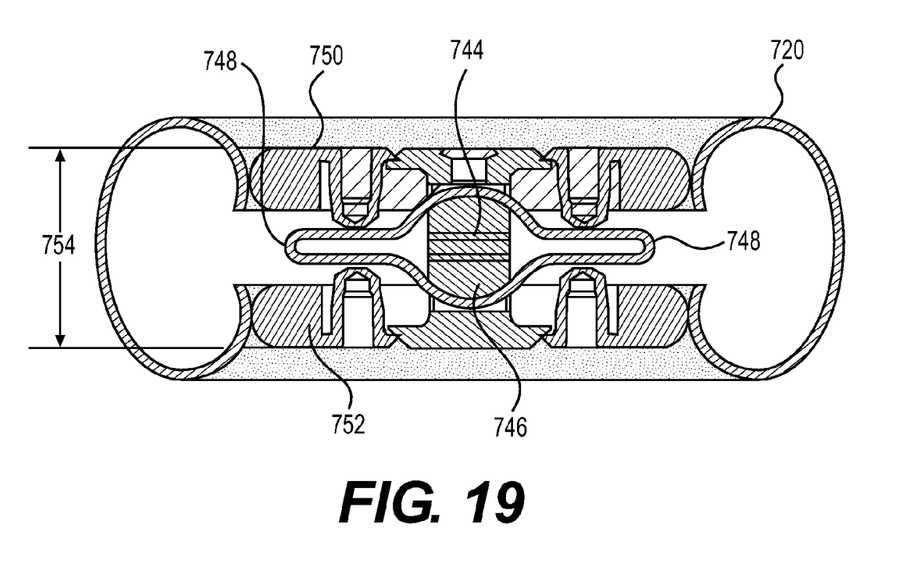
FIG. 19 is a cross-sectional view of the pneumatic bag of FIG. 18, shown in a compressed state thereof in accordance with at least one embodiment of the invention.
Figure 20:
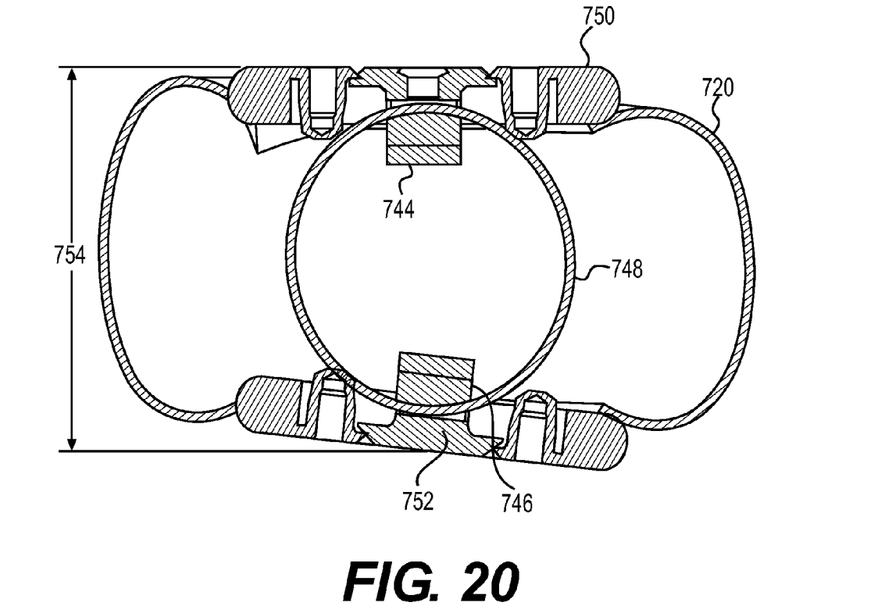
FIG. 20 is a cross-sectional view of the pneumatic bag of FIG. 18, shown in an intermediate state thereof in accordance with at least one embodiment of the invention.
Figure 21:
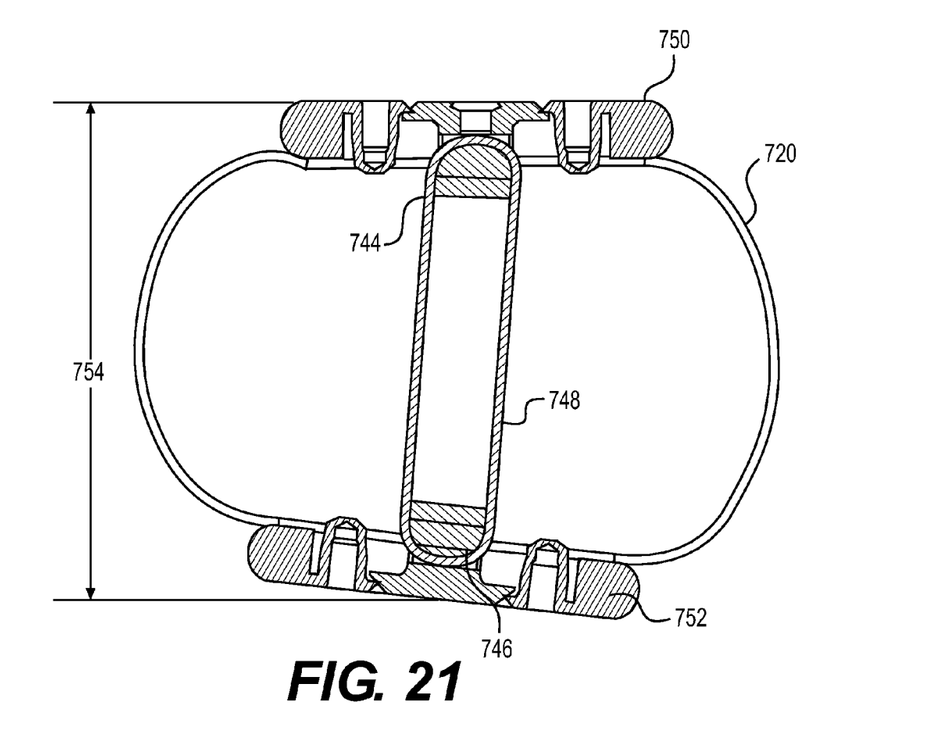
FIG. 21 is a cross-sectional view of the pneumatic bag of FIG. 18, shown in an extended state thereof in accordance with at least one embodiment of the invention.

Still referring to FIG. 18 through FIG. 21, it is possible to appreciate the pneumatic airbag 720 in three distinct states. Firstly, FIG. 19 illustrates the pneumatic airbag 720 in its compressed state 754 when the internal bumpers 744 and 746 are in contact. FIG. 20 illustrates the pneumatic airbag 720 in its shock absorbing state 756 where the internal bumpers 744 and 746 are not in contact and the distance limiter member 748 is not in tension. This is the state 756 where the pneumatic airbag 720 actually absorbs the shocks as a shock absorber. Lastly, the pneumatic airbag 720 is illustrated in its extended state 758 in FIG. 21. The extended state 758 is limited by the extension of the distance limiter member 748 therein. This state happens when the suspension becomes suddenly loadless and tends to extend over and beyond its operational extension. The pneumatic airbag 720 can be embodied differently and have external travel bumpers 744 without departing from the present invention.

The description and the drawings that are presented herein are meant to be illustrative of the present invention. They are not meant to be limiting of the scope of the present invention. Modifications to the embodiments described may be made without departing from the present invention, the scope of which is defined by the following claims:

I claim:

1. A vehicle comprising:
    a frame;
    a drive system including a drive sprocket operatively connected to an endless belt adapted to be rotated to propel the vehicle;
    a suspension system connected to the frame to suspend the frame, the suspension system including a plurality of independent driveless suspension modules longitudinally disposed at a distance from the drive sprocket, each suspension module comprising
        a pivot arm pivotally secured to the frame of the vehicle at a first end thereof about a pivot arm pivot and extending toward a rear portion of the vehicle to pivotally secure a first tandem member at a second end thereof about a first tandem member pivot;
        a first pair of idler wheels rotatably secured to a first end of the first tandem member;
        a second tandem member pivotally secured to a second end of the first tandem member thereof about a second tandem member pivot;
        a second pair of idler wheels rotatably secured to a first end of the second tandem member;
        a third pair of idler wheels rotatably secured to a second end of the second tandem member, the idler wheels being adapted to operatively secure thereon the endless belt; and
        a compressible suspension member operatively secured between the pivot arm and the frame to suspend the vehicle and adapted to absorb a load variation applied to the suspension system, the compressible suspension member being actuated when the pivot arm pivots about the pivot arm pivot.

2. The vehicle of claim 1, wherein the pivot arm is pivotally secured to the frame via a pivot arm pivot having an axis substantially orthogonal to a longitudinal direction of the vehicle.

3. The vehicle of claim 1, wherein the pivot arm is adapted to pivot about the pivot arm pivot along a substantially vertical plan substantially parallel with a longitudinal direction of the vehicle.

4. The vehicle of claim 1, wherein the pivot arm pivot is in substantial alignment with an associated compressible suspension member axis.

5. The vehicle of claim 1, wherein the compressible suspension member includes a pneumatic bladder.

6. The vehicle of claim 1, wherein the compressible suspension member includes a hydraulic shock absorber.

7. The vehicle of claim 1, wherein the suspension system includes four suspension system modules.

8. The vehicle of claim 7, wherein two suspension system modules are disposed at a forward portion of the vehicle, respectively on each lateral side of the vehicle, and two suspension system modules are disposed at a rearward portion of the vehicle, respectively on each lateral side of the vehicle, wherein two suspension system modules disposed on the same lateral side of the vehicle have opposed first pair of idler wheels to minimize endless belt tension variations when the suspension is traveling when reacting to the load variation.

9. The vehicle of claim 1, wherein the first tandem member pivot is longitudinally asymmetrically located about a longitudinal length of the first tandem member.

10. The vehicle of claim 1, wherein the second tandem member pivot is longitudinally asymmetrically located about a longitudinal length of the second tandem member.

11. A vehicle suspension system comprising:
    a plurality of independent driveless suspension modules longitudinally disposed at a distance from a drive sprocket, each suspension module comprising
        a pivot arm pivotally secured to a frame of the vehicle at a first end thereof about a pivot arm pivot and extending toward a rear portion of the vehicle to pivotally secure a first tandem member at a second end thereof about a first tandem member pivot;
        a first pair of idler wheels rotatably secured to a first end of the first tandem member;

a second tandem member pivotally secured to a second end of the first tandem member thereof about a second tandem member pivot;

a second pair of idler wheels rotatably secured to a first end of the second tandem member;

a third pair of idler wheels rotatably secured to a second end of the second tandem member, the idler wheels being adapted to operatively secure thereon the endless belt; and a compressible suspension member operatively secured between the pivot arm and the frame to suspend the vehicle and adapted to absorb a load variation applied to the suspension system, the compressible suspension member being actuated when the pivot arm pivots about the pivot arm pivot.

12. The vehicle suspension system of claim 11, wherein the pivot arm is pivotally secured to the frame via a pivot arm pivot having an axis substantially orthogonal to a longitudinal direction of the vehicle.

13. The vehicle suspension system of claim 11, wherein the pivot arm is adapted to pivot about a pivot arm pivot about a substantially vertical plan substantially parallel with a longitudinal direction of the vehicle.

14. The vehicle suspension system of claim 11, wherein the pivot arm pivot is located in substantial alignment with an associated compressible suspension member axis.

15. The vehicle suspension system of claim 11, wherein the compressible suspension member includes a pneumatic bladder.

16. The vehicle suspension system of claim 11, wherein the suspension system comprises four suspension system modules collectively suspending the vehicle.

17. The vehicle suspension system of claim 16, wherein two suspension system modules are disposed at a forward portion of the vehicle, respectively on each lateral side of the vehicle, and two suspension system modules are disposed at a rearward portion of the vehicle, respectively on each lateral side of the vehicle, wherein two suspension system modules disposed on the same lateral side of the vehicle have opposed first pair of idler wheels to minimize endless belt tension variations when the suspension is traveling when reacting to the load variation.

18. The vehicle suspension system of claim 11, wherein the first tandem member axis is longitudinally asymmetrically located on the first tandem member pivot.

19. The vehicle suspension system of claim 11, wherein the second tandem member axis is longitudinally asymmetrically located on the second tandem member pivot.

20. A suspension system kit for a vehicle, the kit comprising:

a plurality of independent driveless suspension modules longitudinally disposed at a distance from a drive sprocket, each suspension module comprising a pivot arm adapted to be pivotally secured to a frame of the vehicle at a first end thereof about a pivot arm pivot and extending toward a rear portion of the vehicle to pivotally secure a first tandem member at a second end thereof about a first tandem member pivot;

a first pair of idler wheels adapted to be rotatably secured to a first end of the first tandem member;

a second tandem member adapted to be pivotally secured to a second end of the first tandem member thereof about a second tandem member pivot;

a second pair of idler wheels adapted to be rotatably secured to a first end of the second tandem member;

a third pair of idler wheels adapted to be rotatably secured to a second end of the second tandem member, the idler wheels being adapted to rotatably secure thereon the endless belt; and a compressible suspension member adapted to be operatively secured between the pivot arm and the frame to suspend the vehicle and is adapted to absorb a load variation applied to the suspension system when the suspension system kit is mounted on the vehicle, the compressible suspension member being actuated when the pivot arm pivots about the pivot arm pivot.

* * * * *